(12) United States Patent
Kondo et al.

(10) Patent No.: US 8,095,864 B2
(45) Date of Patent: Jan. 10, 2012

(54) ELECTRONIC APPARATUS, PAGE DISPLAY METHOD, PROGRAM, AND STORAGE MEDIUM

(75) Inventors: Hirotaka Kondo, Kanagawa (JP); Naomasa Takahashi, Chiba (JP)

(73) Assignee: Sony Corporation, Tokyo (JP)

( * ) Notice: Subject to any disclaimer, the term of this patent is extended or adjusted under 35 U.S.C. 154(b) by 627 days.

(21) Appl. No.: 10/485,021

(22) PCT Filed: May 26, 2003

(86) PCT No.: PCT/JP03/06521
§ 371 (c)(1),
(2), (4) Date: Aug. 24, 2004

(87) PCT Pub. No.: WO03/102787
PCT Pub. Date: Dec. 11, 2003

(65) Prior Publication Data
US 2007/0118806 A1    May 24, 2007

(30) Foreign Application Priority Data
May 30, 2002  (JP) ............................... P2002-157609

(51) Int. Cl.
*G06F 17/00* (2006.01)
(52) U.S. Cl. ........................................ 715/205; 715/234
(58) Field of Classification Search ............... 715/501.1, 715/513, 202–205, 234, 760, 200
See application file for complete search history.

(56) References Cited

U.S. PATENT DOCUMENTS

| | | | | |
|---|---|---|---|---|
| 6,009,429 | A * | 12/1999 | Greer et al. | 707/10 |
| 6,029,182 | A * | 2/2000 | Nehab et al. | 715/205 |
| 6,182,072 | B1 * | 1/2001 | Leak et al. | 707/10 |
| 6,572,662 | B2 * | 6/2003 | Manohar et al. | 715/526 |
| 2002/0030697 | A1 | 3/2002 | Oikawa | |
| 2007/0143683 | A1 * | 6/2007 | Quimby | 715/730 |

FOREIGN PATENT DOCUMENTS

| EP | 0 945 811 | 9/1999 |
|---|---|---|
| JP | 2001-242980 | 9/2001 |
| WO | WO 98/18088 | 4/1998 |
| WO | WO 01/55897 | 8/2001 |

OTHER PUBLICATIONS

Hardman L. et al., "SMIL 2.0—Interactive Multimedia on the Web", Internet Citation, [Online] 2001, XP002300407 (URL:http://homepages.cwi.nl/lynda/tue-2R480/SMILTut.pdf).

* cited by examiner

*Primary Examiner* — Thu Huynh
(74) *Attorney, Agent, or Firm* — Finnegan, Henderson, Farabow, Garrett & Dunner, L.L.P.

(57) ABSTRACT

An electronic apparatus capable of displaying linked pages in turn by an easy operation for users is provided.
In a <body> element in an SMIL document, the attribute ?? dur=t is added to URI description for specifying a media element. The resulting notation implies that a file name placed before ?? indicates a designated page and a link destination of the designated page is displayed. A numerical value following dur= indicates the duration for which a given link contained in the designated page can be activated. An SMIL player interprets an SMIL document having such a description, so as to allow auto-linking to the link destinations of the designated page with the defined link intervals.

14 Claims, 15 Drawing Sheets

FIG. 4

```
<smil xmlns="http://www.w3.org/2000/SMIL20/CR/Language">
<head>
<layout type="text/smil-basic-layout">
<root-layout width="640" height="480" />
<region id="r1" top="0" left="0" width="320" height="480" fit="fill" />
<region id="r2" top="0" left="320" width="320" height="480" fit="fill" />
</layout>
</head>
<body>
<par dur="indefinite">
<text id="id1" src="http://www.sony.co.jp/index.html" region="r1" />
<text id="id2" src="http://www.sony.co.jp/index.html??dur=10" region="r2" />
</par>
</body>
</smil>
```

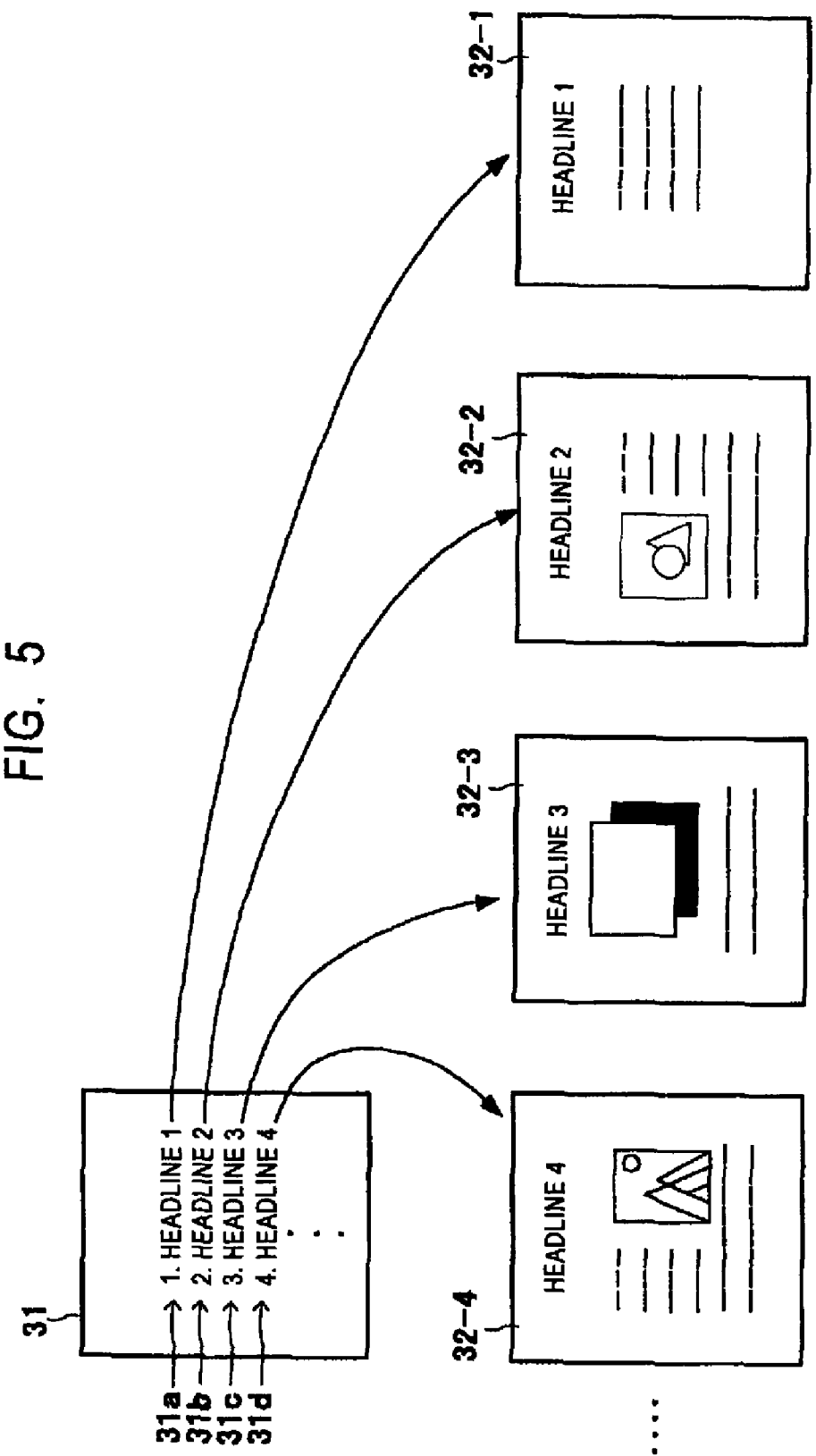

FIG. 9

```
<smil xmlns="http://www.w3.org/2000/SMIL20/CR/Language">
<head>
<layout type="text/smil-basic-layout">
<root-layout width="640" height="480" />
<region id="r1" top="0" left="0" width="320" height="480" fit="fill" />
<region id="r2" top="0" left="320" width="320" height="240" fit="fill" />
<region id="r3" top="240" left="320" width="320" height="240" fit="fill" />
</layout>
</head>
<body>
<par dur="indefinite">
<text id="id1" src="http://www.sony.co.jp/index.html" region="r1" />
<text id="id2" src="http://www.sony.co.jp/index.html?2dur=10:item=2.1" region="r2" />
<text id="id3" src="http://www.sony.co.jp/index.html?2dur=10:item=2.2" region="r3" />
</par>
</body>
</smil>
```

FIG. 10

```
<smil xmlns="http://www.w3.org/2000/SMIL20/CR/Language">
<head>
<layout type="text/smil-basic-layout">
<root-layout width="640" height="480" />
<region id="r1" top="0" left="0" width="320" height="240" fit="fill"/>
<region id="r2" top="240" left="0" width="320" height="240" fit="fill"/>
<region id="r3" top="0" left="320" width="320" height="480" fit="fill"/>
</layout>
</head>
<body>
<par dur="indefinite">
<text id="id1" src="http://www.sony.co.jp/index.html" region="r1"/>
<text id="id2" src="http://www.sony.co.jp/index.html?link=1" region="r2"/>
<text id="id3" src="http://www.sony.co.jp/index.html?dur=10:link=2:count=MAX" region="r3"/>
</par>
</body>
</smil>
```

FIG. 11

```
<smil xmlns="http://www.w3.org/2000/SMIL20/CR/Language">
<head>
<layout type="text/smil-basic-layout">
<root-layout width="640" height="480" />
<region id="r1" top="0" left="0" width="320" height="240" fit="fill" />
<region id="r2" top="240" left="0" width="320" height="240" fit="fill" />
<region id="r3" top="0" left="320" width="320" height="480" fit="fill" />
</layout>
</head>
<body>
<par dur="indefinite">
<text id="id1" src="http://www.sony.co.jp/index.html" region="r1" />
<text id="id2" src="http://www.sony.co.jp/index.html??dur=120" region="r2" />
<text id="id3" src="http://www.sony.co.jp/index.html??dur=10;link=2" region="r3" />
</par>
</body>
</smil>
```

ELECTRONIC APPARATUS, PAGE DISPLAY METHOD, PROGRAM, AND STORAGE MEDIUM

TECHNICAL FIELD

The present invention relates to an electronic apparatus, such as a television set, having, for example, a Web page display function, to a page display method, to a program, and to a storage medium.

BACKGROUND ART

In pages created in a markup language such as HTML (Hyper Text Markup Language), hyperlinks allow users to jump from a currently viewed page to pages associated with desired objects in this page.

The hyperlinks are generally triggered by an active operation of a reader, such as by the reader clicking a mouse on a desired object. When a reader wants to successively view a plurality of pages linked to a given page, the reader must specify link destinations on the link source page in turn.

A known technique for displaying linked pages without being specified by a reader is described in, for example, Japanese Unexamined Patent Application Publication No. 10-40062. In this technique, a page is parsed to find out page addresses linked from this page, and the page addresses are used to obtain and concurrently display one or a plurality of linked pages.

However, this technique does not allow the linked pages to be displayed in order over time. The pages cannot be displayed with predetermined time intervals, either.

Another problem with the active operation of readers required for obtaining linked pages is that the latest information of a page whose content is frequently updated, such as news, can be missing if the page content is updated on a server.

In view of such situations, it is an object of the present invention to provide an electronic apparatus capable of displaying linked pages in turn by an easy operation for users, a page display method, a program, and a storage medium.

DISCLOSURE OF INVENTION

The foregoing problems are overcome by an electronic apparatus according to a primary aspect of the present invention including a display unit having a display screen; means for reading a program including at least allocation information for defining a display region to be allocated in the display screen, page specification information for specifying a desired page containing one or more links, and information regarding linking of the specified page to linked pages; means for configuring the display region in the display screen based on the allocation information of the read program; means for obtaining the specified page based on the page specification information of the read program; and linking means for sequentially obtaining the linked pages of the specified page based on the linking information of the read program and displaying the obtained pages in the display region configured in the display screen.

According to this invention, pages linked from a designated page can be sequentially obtained based on linking information, and can be displayed in a display region configured in a display screen. Thus, the linked pages can be sequentially obtained and displayed even if a user does not specify a link destination of the designated page.

In the electronic apparatus of the present invention, the linking information may include information for defining a link time interval, and the linking means may allow the linked pages displayed in the display region to be changed based on the link time interval.

According to this invention, auto-linking is carried out based on the link time interval defined in the program. Users are only required to instruct auto-linking.

In the electronic apparatus of the present invention, furthermore, the linking information may further include information for defining a link range, and the linking means may allow the linked pages displayed in the display region to be changed within the link range.

This invention can place any limitation, such as the number of links, on auto-linking.

In the electronic apparatus of the present invention, furthermore, the link range may include limitation on a hierarchical link depth.

In the electronic apparatus of the present invention, furthermore, the linking information may further include information for defining the number of linked pages to be concurrently displayed, and the linking means may allow the defined number of linked pages to be concurrently displayed in different display regions which are configured in the display screen.

This enables a plurality of linked pages to be concurrently displayed in a display screen. The number of linked pages can be freely specified.

A page display method according to another aspect of the present invention in which a display unit having a display screen, a control unit, and a storage unit are provided is that the control unit causes a program to be read and stored in the storage unit, the program including at least allocation information for defining a display region to be allocated in the display screen, page specification information for specifying a desired page containing one or more links, and information regarding linking of the specified page to linked pages, causes the display region to be configured in the display screen based on the allocation information of the program stored in the storage unit, causes the specified page to be obtained based on the page specification information of the program stored in the storage unit, and causes the linked pages of the specified page to be sequentially obtained based on the linking information of the program stored in the storage unit so as to display the obtained pages in the display region configured in the display screen.

According to the page display method, the above-described program is read, and, according to the information regarding linking of a designated page to linked pages, which is stored in the program, the linked pages of the designated page can be sequentially obtained and displayed in a display region configured in a display screen. Thus, the linked pages can be sequentially obtained and displayed even if a user does not specify a link destination of the designated page.

In the page display method of the present invention, the linking information may include information for defining a link time interval, and the control unit may cause the linked pages displayed in the display region to be changed at the link time interval.

According to this invention, auto-linking is carried out based on the link time interval defined in the program. Users are only required to instruct auto-linking.

In the page display method of the present invention, furthermore, the linking information may further include information for defining a link range, and the control unit may cause the linked pages displayed in the display region to be changed within the link range.

This invention can place any limitation, such as the number of links, on auto-linking.

In the page display method of the present invention, furthermore, the link range may include limitation on a hierarchical link depth.

In the page display method of the present invention, furthermore, the linking information may further include information for defining the number of linked pages to be concurrently displayed, and the control unit may cause the defined number of linked pages to be concurrently displayed in different display regions which are configured in the display screen.

This enables a plurality of linked pages to be concurrently displayed in a display screen. The number of linked pages can be freely specified.

A program according to still another aspect of the present invention includes allocation information for defining a display region to be allocated in a display screen, page specification information for specifying a desired page containing one or more links, and information regarding linking of the specified page to linked pages.

According to this invention, the above-described program is read by an electronic apparatus, and, according to the information regarding linking a designated page to linked pages, which is stored in the program, the linked pages of the designated page can be sequentially obtained and displayed in a display region configured in a display screen. Thus, the linked pages can be sequentially obtained and displayed even if a user does not specify a link destination of the specified page.

In the program of the present invention, the linking information may include information for defining a link time interval.

According to this invention, in an electronic apparatus, auto-linking can be carried out based on the link time interval defined in the program. Users are only required to instruct auto-linking.

In the program of the present invention, furthermore, the linking information may further include information for defining a link range.

This invention can place any limitation, such as the number of links, on auto-linking.

In the program of the present invention, furthermore, the link range may include limitation on a hierarchical link depth.

In the program of the present invention, furthermore, the linking information may further include information for defining the number of linked pages to be concurrently displayed.

This enables a plurality of linked pages to be concurrently displayed in a display screen. The number of linked pages can be freely specified.

The program of the present invention may be provided as a document described in an extensible markup language.

A storage medium according to still another aspect of the present invention is a storage medium having a program stored therein, the program including allocation information for defining a display region to be allocated in a display screen, page specification information for specifying a desired page containing one or more links, and information regarding linking of the specified page to a linked page.

According to this invention, the above-described program is read by an electronic apparatus, and, according to the information regarding linking of a designated page to linked pages, which is stored in the program, the linked pages of the designated page can be sequentially obtained and displayed in a display region configured in the display screen.

BRIEF DESCRIPTION OF THE DRAWINGS

FIG. 4 is a view showing an example of extended SMIL notation.

FIG. 5 is a view showing an example of linking between a plurality of pages.

FIG. 9 is a view showing an example of SMIL notation which realizes the presentation shown in FIG. 7.

FIG. 10 is a view showing an example of SMIL notation which realizes the presentation shown in FIG. 8.

FIG. 11 is a view showing another example of SMIL notation which realizes the presentation shown in FIG. 8.

BEST MODE FOR CARRYING OUT THE INVENTION

An embodiment of the present invention is described hereinbelow with reference to the drawings.

Figure 1A:
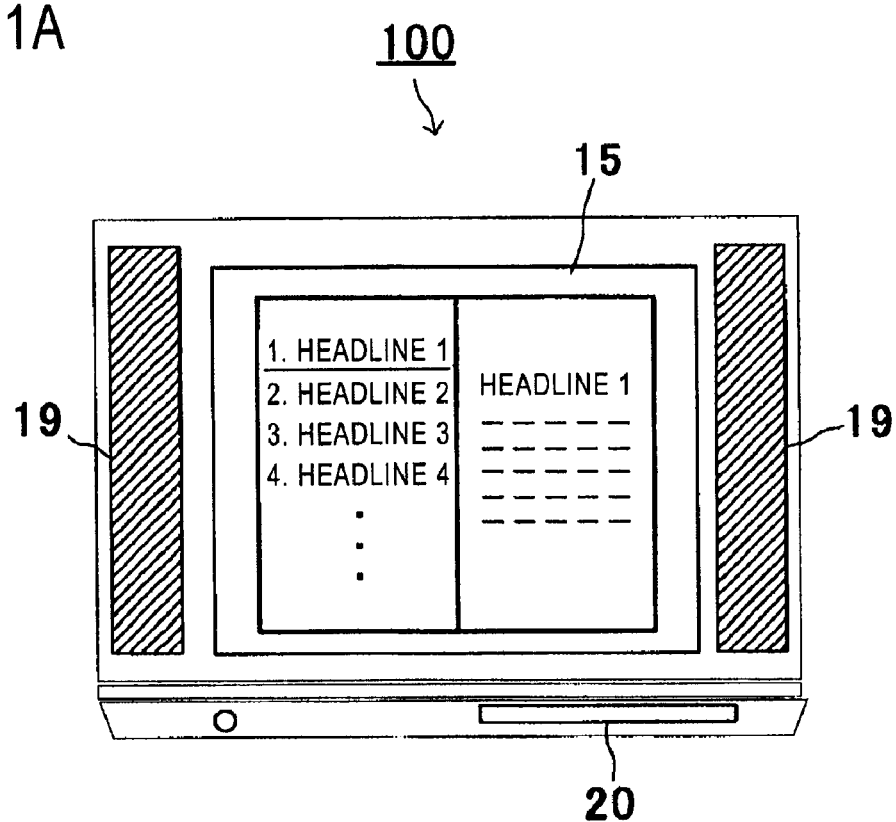
FIGS. 1A and 1B are illustrations of a television set 100 according to an embodiment of the present invention.
Figure 1B:
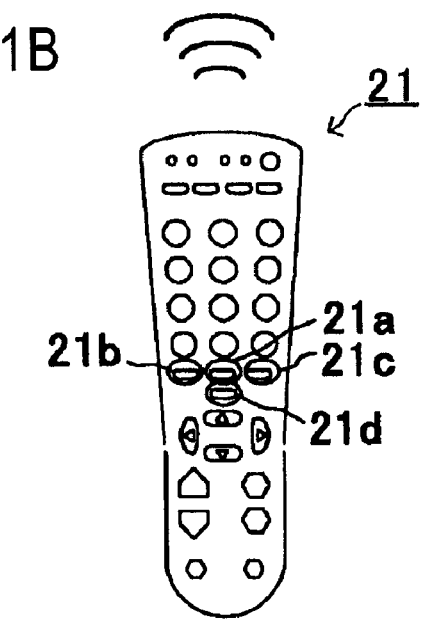
Figure 2:
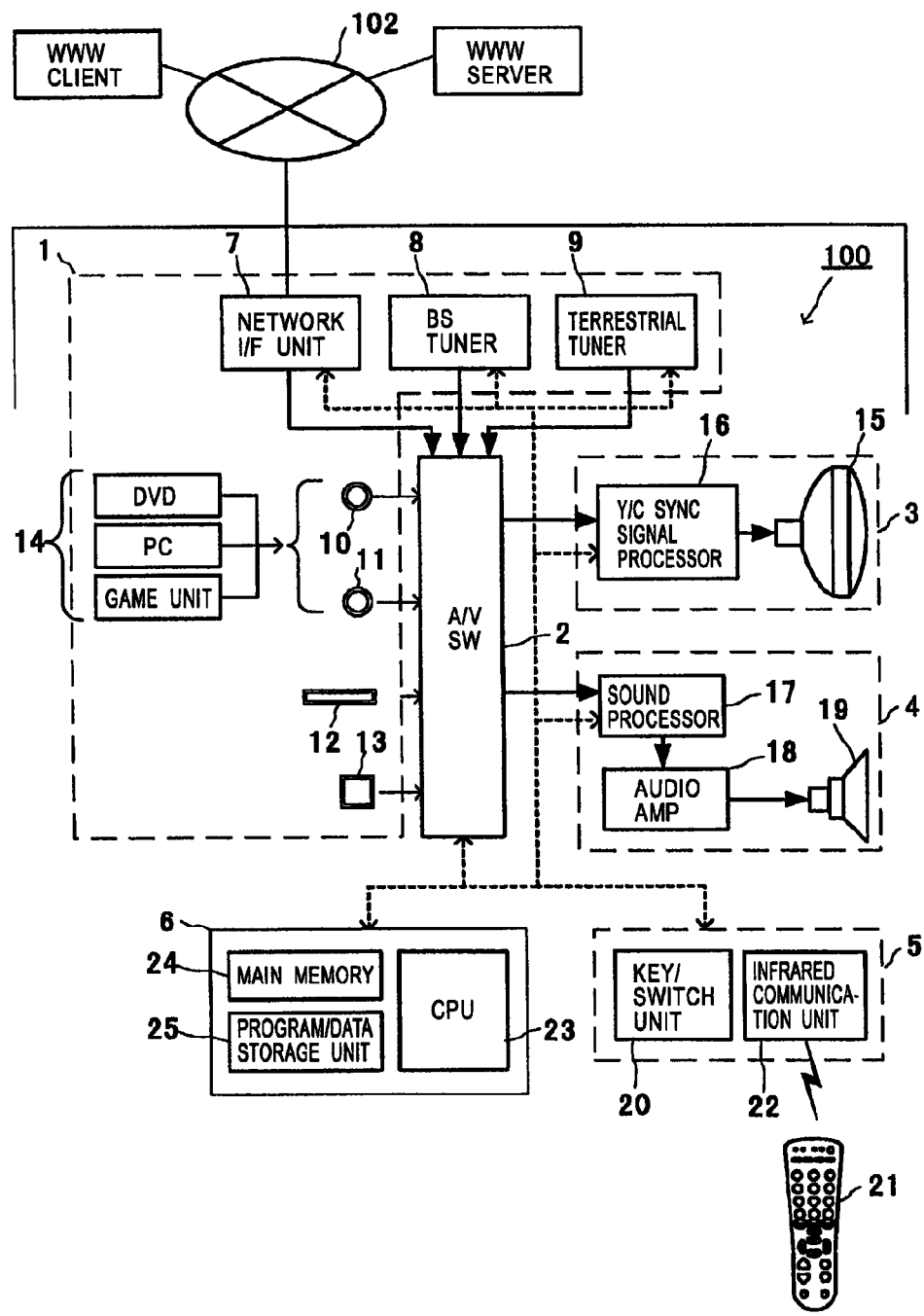
FIG. 2 is a block diagram showing the structure of the television set shown in FIG. 1.

FIGS. 1A and 1B are illustrations of a television set 100 according to an embodiment of the present invention. FIG. 2 is a block diagram showing the structure of the television set 100.

As shown in FIG. 2, the television set 100 is formed of an interface unit 1 serving as means for connecting to an external information source, an A/V_SW 2 for separating video information and audio information input via the interface unit 1, a video unit 3 for processing the video information, an audio unit 4 for processing the audio information, an operation input unit 5 for inputting an operational instruction from a user, and a control unit 6 for controlling the components and executing various calculation processes.

The interface unit 1 includes a network interface unit (network I/F unit) 7 serving as means for connecting to a WWW (World Wide Web) 102, a BS tuner 8 for selecting BS broadcasts, a terrestrial tuner 9 for selecting terrestrial broadcasts, a video input terminal 10, an audio input terminal 11, a memory card slot 12 for memory card reading and writing, an i.LINK (DV terminal) 13 through which information from a digital video camera, etc., is captured, and so on. Video information from a digital data device 14 such as a DVD (Digital Versatile Disc), a PC (Personal Computer), or a game unit can be captured through the video input terminal 10.

The video unit 3 is formed of a display 15 such as a CRT (Cathode Ray Tube) or an LCD (Liquid Crystal Display), and a Y/C sync signal processor 16 for generating a video signal, which can be displayed on the display 15, from the video information selected by the A/V_SW 2.

The audio unit 4 is formed of a sound processor 17 for processing the audio information selected by the A/V SW 2, an audio amp 18 for amplifying the audio signal output from the sound processor 17, and a speaker 19 for audibly outputting the amplified audio signal.

The operation input unit 5 is formed of a key/switch unit 20 disposed on the main body of the television set, and an infrared communication unit 22 for Ir (Infrared) wireless communication with a remote controller 21.

The control unit 6 is formed of a CPU (Central Processing Unit) 23, a main memory 24, a program/data storage unit 25, and so on.

The CPU (Central Processing Unit) 23 executes various calculation processes or controls, using the main memory 24 as a work space, based on the program or data stored in the program/data storage unit 25, an input from the operation input unit 5, or the like. The main memory 24 is, for example, a high-speed memory capable of random reading and writing, such as a RAM (Random Access Memory). The program/data storage unit 25 is a read-only or rewritable non-volatile storage device, such as a ROM (Read Only Memory), a flash ROM, or a disk drive.

The television set 100 has functions of obtaining a document described in an extensible markup language from the WWW 102, the external information source, or the like, analyzing the document, and reflecting an analysis result to a display screen.

In the following description, the extensible markup language is SMIL (Synchronized Multimedia Integration Language), by way of example. SMIL is an XML (extensible Markup Language)-based synchronized multimedia integration language standardized by the W3C (World Wide Web Consortium).

Figure 3:
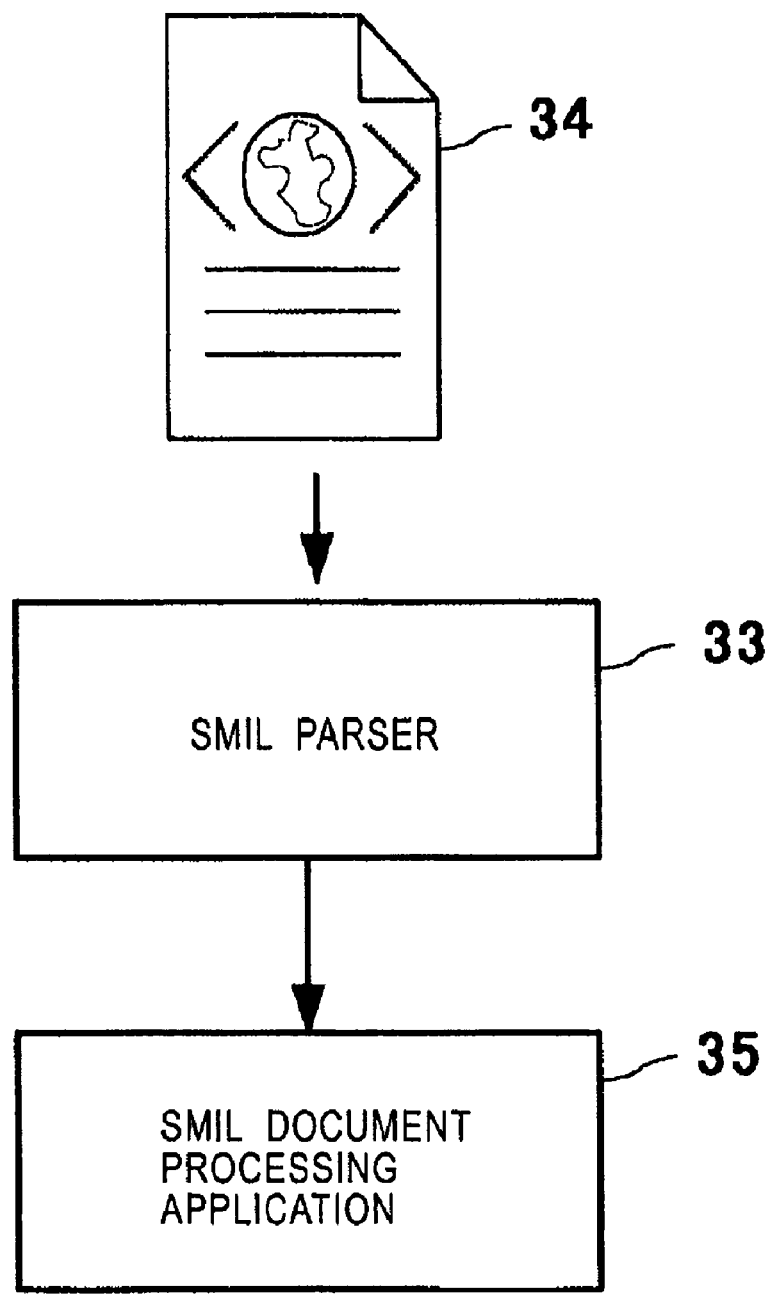
FIG. 3 is a diagram showing the structure of an SMIL document processing unit (SMIL player).

FIG. 3 shows an SMIL document processing unit (SMIL player).

As shown in FIG. 3, in response to a request from an application 35 for visually or audibly processing an SMIL document 34, a SMIL parser 33 reads the SMIL document 34 for syntax checking, validity checking as an SMIL document, schema matching checking, analysis, and so on, to generate data in a form suitable for the application 35.

The SMIL parser 33 separates the SMIL document 34 into syntactic components based on an analysis result of the SMIL document 34, and, for example, one or more display regions are configured in a display screen. The SMIL parser 33 determines which media element is allocated in each display region.

More specifically, if the SMIL document 34 has a <layout> element as a child of a <head> element, a region element <region> in which the media element encapsulated in <body> of the SMIL document is allocated on the screen is configured based on the <layout> element.

When a page is specified as a media element encapsulated in the <body> element of the SMIL document 34, the following notation is generally used:

<text src="http://www.sony.co.jp/
        index.html"region="r1">                  (1)

In this manner, files must be directly specified in SMIL. Therefore, a link destination page contained in a designated page cannot be specified in the present SMIL standard, because link destination information cannot be obtained until the designated page is parsed. In the SMIL notation, link destinations are not identified and the link destinations cannot be specified.

In order to overcome this inconvenience, an attribute ?? dur=5 is added to the URI (Uniform Resource Identifiers) description in the following manner:

<text src="http://www.sony.co.jp/
        index.html??dur=5"region="r1">          (2)

If dur= is followed by ??, this implies that the file name before ?? corresponds to the designated page (link source page) and the link destination of the designated page is displayed. A numerical value following dur= indicates the duration for which a given link contained in the designated page can be activated. In this example, links are activated every five-second interval.

FIG. 4 shows an example of the above-described extended SMIL notation.

The extended description is indicated by underlining.

In the <layout> element as a child of the <head> element, two regions, that is, "r1" and "r2", are defined. The link source page, i.e., http://www.sony.co.jp/index.html, is displayed in the area identified by the region "r1", and link destinations included in the link source page displayed in the region "r1" are displayed in the area identified by the region "r2". Links are activated every ten-second interval.

This SMIL notation allows for auto-linking to the link destinations in the following way.

FIG. 5 shows an example of linking between pages. It is assumed that a plurality of items 31a, 31b, 31c, 31d, . . . including addresses of linked pages are defined in a designated page (link source page) 31.

Figure 6:
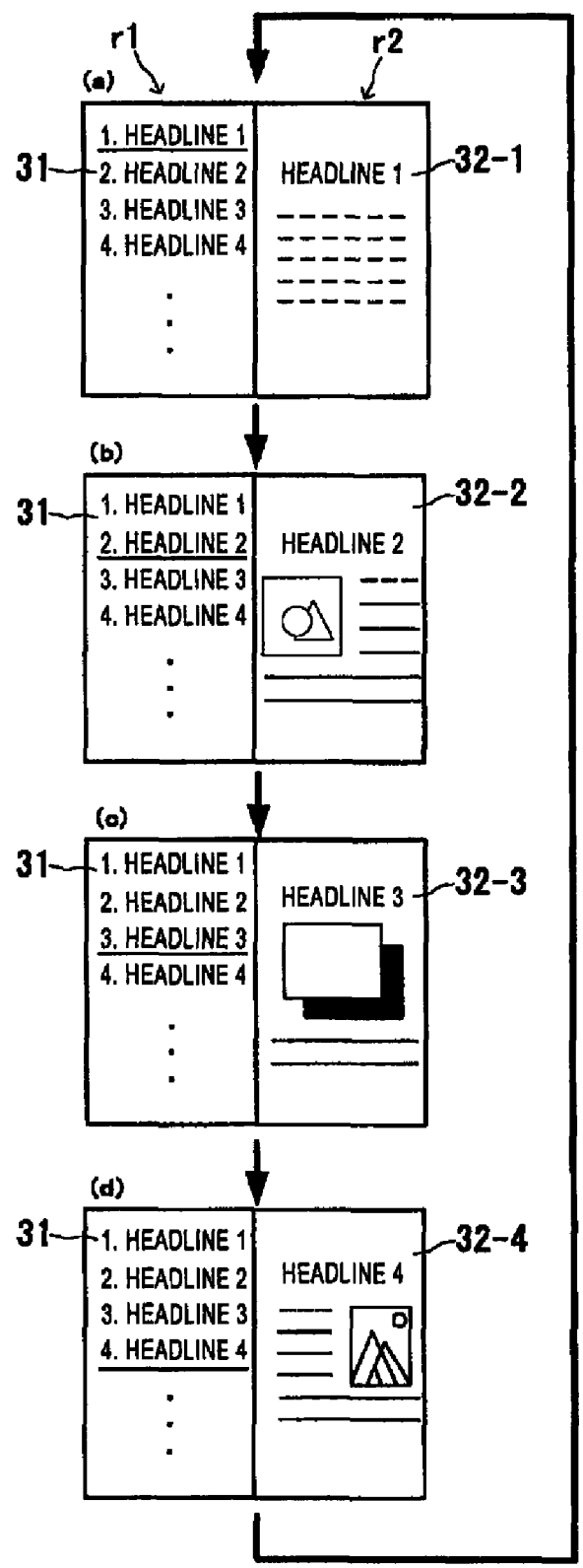
FIG. 6 is a view showing an example of page presentation of the SMIL notation shown in FIG. 4.

According to the SMIL notation shown in FIG. 4, the two display regions r1 and r2 shown in FIG. 6 are configured in the display screen. The designated page 31 is displayed in the display region r1, and linked pages 32-1, 32-2, 32-3, 32-4, . . . corresponding to the items 31a, 31b, 31c, 31d, . . . of the designated page 31 are displayed in the display region r2 page-by-page every ten-second interval.

When the designated page 31 is first displayed, the top item 31a is focused on. The focus is a function of constantly giving the input permission to a single object in each display region. The focused object is visually distinguishable by, for example, underlining, a different color, or the like.

In the television set 100, a timer interrupt occurs with predetermined time intervals, and a move-forward code for causing the focused object to move forward is sent to the display region r1.

If the object newly focused on in the display region r1 by a move-forward/backward code is one of the items, the address of the linked page defined in this item is set as link destination page information to be displayed in the display region r2, thereby displaying the linked page.

Figure 7:
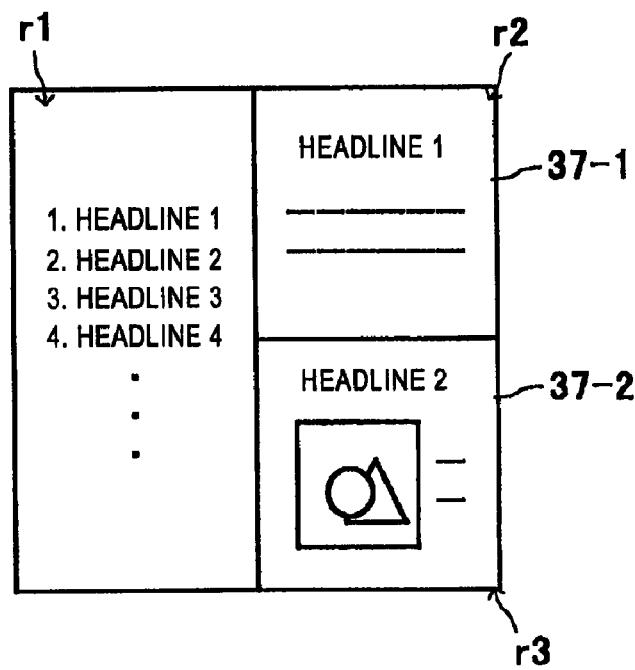
FIG. 7 is a view showing an example of page presentation including a designated page and a plurality of pages linked from the designated page.
Figure 8:
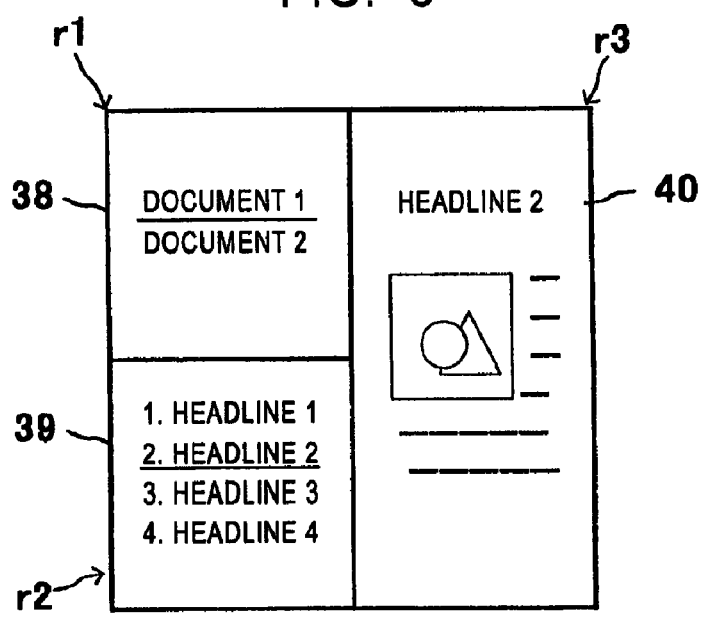
FIG. 8 is a view showing an example of page presentation including a designated page and a plurality of pages hierarchically linked from the designated page.

Multiple display cases where, as shown in FIG. 7, a plurality of link destinations 37-1 and 37-2 of a designated page 36 are concurrently displayed and where, as shown in FIG. 8, a page 39 linked from a designated page 38 and a page 40 further linked from the linked page 39 are concurrently displayed are described hereinbelow.

In such cases, the following extended SMIL document may be used:

<text src="http://www.sony.co.jp/index.html??dur=5;
        link=2;item=2,1;count=10"region="r1">     (3)

The added description is link=2, item=2,1; count=10.

The attribute item=i,j specifies an inter-link interval and a link start position, where i indicates the inter-link interval and j indicates the link start position. The example in (3) implies that, in a link-destination display region having this attribute, the top link destination is first displayed and the third link destination two links forward from the top is then displayed.

Without item=i,j, the link destinations are displayed in order in the link-destination display region. The addition of this attribute allows different link destinations to be displayed in desired display regions, as shown in FIG. 7.

The attribute count=m specifies the number of links to be activated. This attribute allows the designated page to be changed from, for example, as shown in FIG. 8, a document 1 to a document 2 based on the duration or the number of links.

For example, in the latter case, when the designated page is changed after the designated page is linked to the last link destination, in the standard SMIL notation where the number of links cannot be identified, for example, "count=MAX" is written, which allows for linking to up to the last link.

The attribute link=n specifies the depth of link destinations to be displayed (the number of hierarchies). If link=2, a page linked to a linked page defined in a designated page can be displayed.

Without link=n, specification of dur=t, as in (2), allows link destinations defined in the designated page to be displayed in order.

Conversely, without the dur=t attribute, as in

<text src="http://www.sony.co.jp/
 index.html??link=1"region="r1"> (4), link destinations are displayed, although auto-linking to the link destinations is not carried out. However, as in (3), if there are tags indicating the link destination shown in (4) and the number of links is specified by count=m, the link timing of the designated page can be determined based on the link duration and the number of links, thus allowing for auto-linking to the link destinations.

FIG. 9 shows an example of extended SMIL notation, which realizes the presentation shown in FIG. 7.

The extended description is indicated by underlining. In this example, the page http://www.sony.co.jp/index.html is displayed in the area identified by the region "r1", and one of the linked pages contained in the page http://www.sony.co.jp/index.html displayed in the region "r1", that is, the "HEADLINE 1" page 37-1 shown in FIG. 7, is displayed in the area identified by the region "r2". The linked page which is contained in the page http://www.sony.co.jp/index.html displayed in the region "r1" and which is next to the linked page displayed in the region "r2", that is, the "HEADLINE 2" page 37-2 shown in FIG. 7, is further displayed in the area identified by the region "r3".

After ten seconds, the "HEADLINE 3" page is displayed in the region "r2", and the "HEADLINE 4" page is displayed in the region "r3".

This extended notation allows a desired number of link destinations of a designated page to be displayed in different regions, and the display of the link destinations can be changed in units of the desired number of regions.

FIGS. 10 and 11 show examples of the SMIL notation which realizes the presentation shown in FIG. 8. The extended description is indicated by underlining. In FIGS. 10 and 11, the page 38, http://www.sony.co.jp/index.html, is displayed in the area identified by the region "r1", and the linked page 39 contained in the page http://www.sony.co.jp/index.html displayed in the region "r1" is displayed in the area identified by the region "r2". The page 40 linked from the page displayed in the region "r2" is further displayed in the region "r3".

FIG. 10 shows an example in which links are activated every ten-second interval in the region "r2" and the next link is activated in the region "r1" after the last link has been activated. That is, the next page is displayed in the region "r2" after all link destinations contained in this page have been displayed in the region "r3".

FIG. 11 shows an example in which links are activated every ten-second interval in the region "r2" and links are activated every 120-second interval in the region "r1".

The SMIL notation extended in the manner described above has no effect on processing of a standard SMIL player because the standard SMIL player ignores the description after ??, and simply presents the file specified before ??. In other words, only an SMIL player supporting such an extended SMIL notation is able to correctly interpret dur=t or link=n after ??, so as to allow auto-linking to the link destinations.

In the foregoing description, in order to maintain compatibility with standard SMIL players, attributes are added to the <text> element so as to allow auto-linking to the link destinations. However, tags having equivalent meaning may be added to provide similar extension. Otherwise, HTML+TIME technology having a similar function to SMIL can be used to provide similar extension.

A procedure for creating such an extended SMIL document is described hereinbelow.

Figure 12:
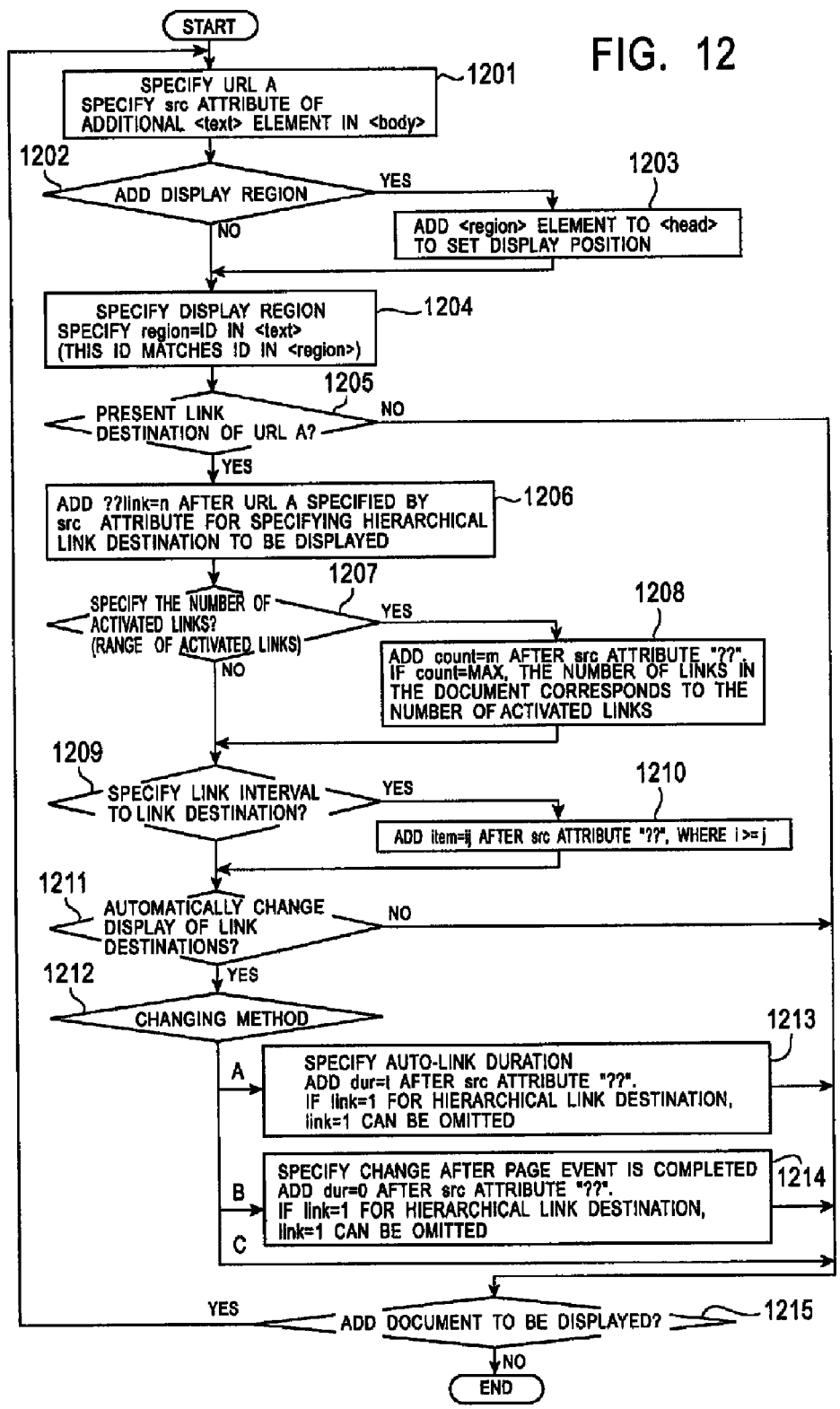
FIG. 12 is a flowchart of a procedure for creating an extended SMIL document.

FIG. 12 is a flowchart showing the operation of an application for creating the above-described SMIL notation through interaction with an author.

First, a <text> element which defines a file of a page to be displayed is added to <body> (step 1201).

If a display region for this page is newly added (YES is obtained in step 1202), a <region> element is added to <head> (step 1203). If it is not added, the process proceeds to step 1204.

Then, region=ID is added to the added <text> element so that the file page is displayed in the added display region or an existing display region (step 1204), where ID is an ID in the <region> element added in step 1203 or an ID in the existing <region> element.

Then, it is determined whether the display of a link destination of the file page becomes active or not. If the display of a link destination becomes active (YES is obtained in step 1205), link=n is written after the src attribute ?? in the added <text> element (step 1206).

If the number of links to be activated is specified (YES is obtained in step 1207), count=m is written after the src attribute ?? in the added <text> element (step 1208).

If this page is linked to all link destinations, count=MAX is set.

If the link interval to the link destination is specified (YES is obtained in step 1209), item=i,j is written after the src attribute ?? in the added <text> element (step 1210).

It is further determined whether or not the display of link destinations is automatically changed (step 1211). If it is automatically changed, the changing method is determined (step 1212).

If the display of link destinations is automatically changed based on a duration (A is selected in step 1212), dur=t is written after the src attribute ?? in the added <text> element (step 1213). If link=1, link=1 can be omitted.

If the link destination is streaming data, such as video or audio, and the link destination is changed after the data has been played back (B is selected in step 1212), dur=0 is written after the src attribute ?? in the added <text> element (step 1214). Also, if link=1, link=1 can be omitted.

If link destinations of a currently selected page are displayed in another display region and count=MAX is set for the link destination pages to be displayed, that is, if the currently selected page is changed after the last link destination has been displayed (C is selected in step 1212), the <text> element ends here.

If there are pages to be displayed in this display region and another display region, the process returns to the first step (step 1215).

A procedure for processing the SMIL document created by this procedure using, for example, the SMIL player of the television set 100 shown in FIG. 2 is described hereinbelow.

As described above, the SMIL player is formed of an application for visually or audibly processing an SMIL document, and an SMIL parser for, in response to a request from this application, reading the SMIL document for syntax checking, validity checking as an SMIL document, schema matching checking, analysis, and so on, to generate data in a form suitable for the application.

Figure 13:
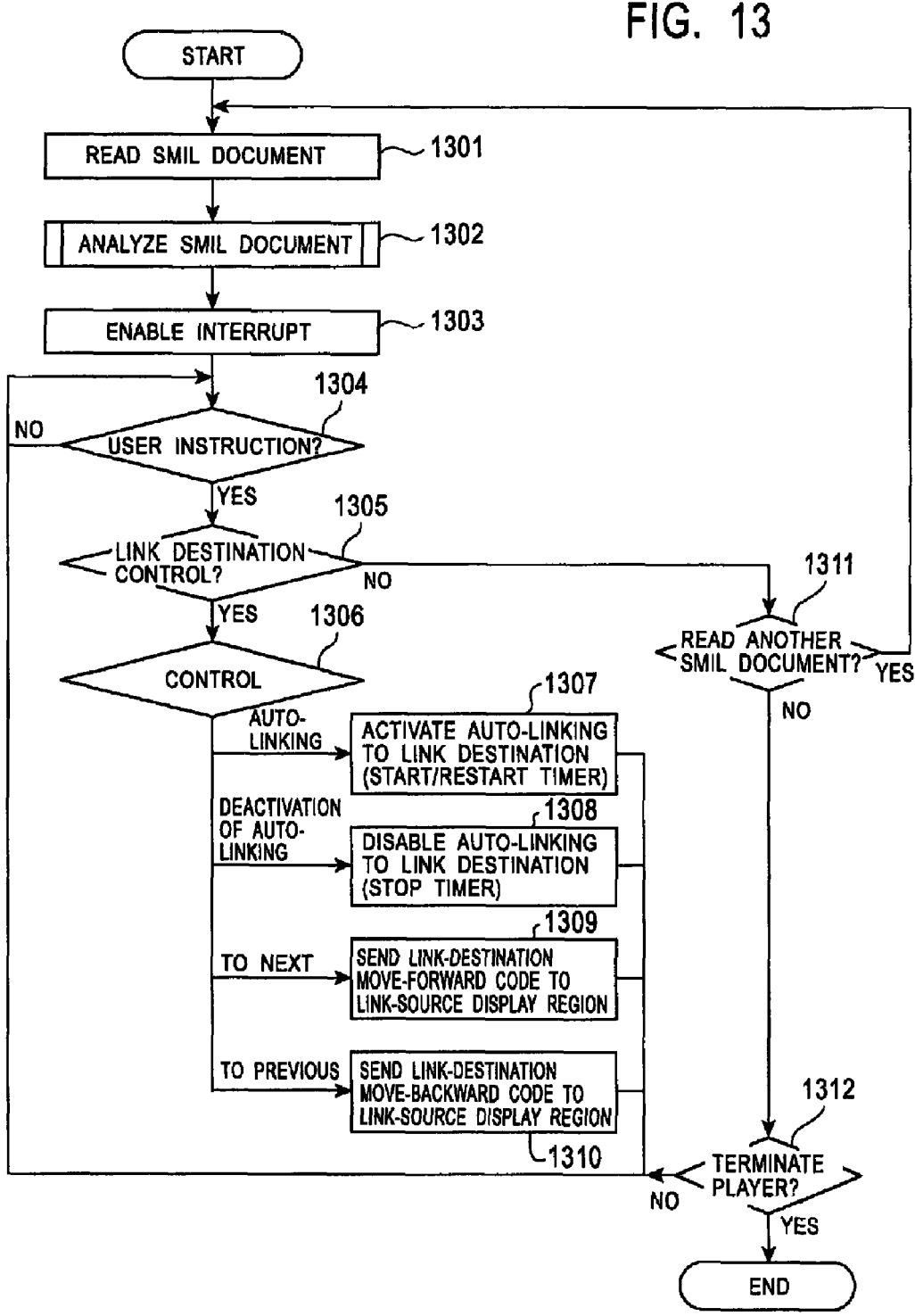
FIG. 13 is a flowchart showing how an SMIL player processes an SMIL document.

FIG. 13 is a flowchart showing how the SMIL player processes the SMIL document.

First, the application reads the SMIL document through the SMIL parser (step 1301). In the SMIL parser, the read SMIL document is subjected to syntax checking, validity checking as an SMIL document, schema matching checking, and so on, followed by analysis (step 1302). The analysis of the SMIL document is described in detail below.

After the SMIL parser successfully finishes the aforementioned checking operations and analysis of the SMIL document, interrupts including a timer interrupt, an interrupt induced by a status change in a link-source display region, and an interrupt induced by completely reading received data, as described below, are enabled (step 1303).

When the application detects a user instruction (step 1304), if this instruction indicates link activation control (YES is obtained in step 1305), link activation is controlled according to this control.

The user instruction is given by, for example, the remote controller 21 of the television set 100 shown in FIGS. 1 and 2. The remote controller 21 includes a button 21a for instructing auto-linking to the link destination, a button 21b for instructing link back to the previous link destination, a button 21c for instructing link forward to the next link destination, a button 21d for disabling auto-linking to the link destination, and so on.

When an instruction is given by the auto-link-to-link-destination button 21a, auto-linking to the link destination is enabled to start an auto-link timer, for example, if the value of this timer is set to one or more. If the timer has started, the timer restarts (step 1307).

When an instruction is given by the auto-link-to-link-destination disabling button 21d, auto-linking to the link destination is disabled if auto-linking to the link destination is active. For example, if the auto-link timer has started, the timer stops (step 1308).

When an instruction is given by the link-forward instruction button 21c, a code for causing the focused item to move forward in the link-source display region is given to the application. The application processes this move-forward code to automatically link to the next link destination (step 1309).

When an instruction is generated by the link-back instruction button 21b, a code for causing the focused item to move backward in the link-source display region is given to the application. The application processes this move-backward code to automatically link back to the previous link destination (step 1310).

Figure 14:
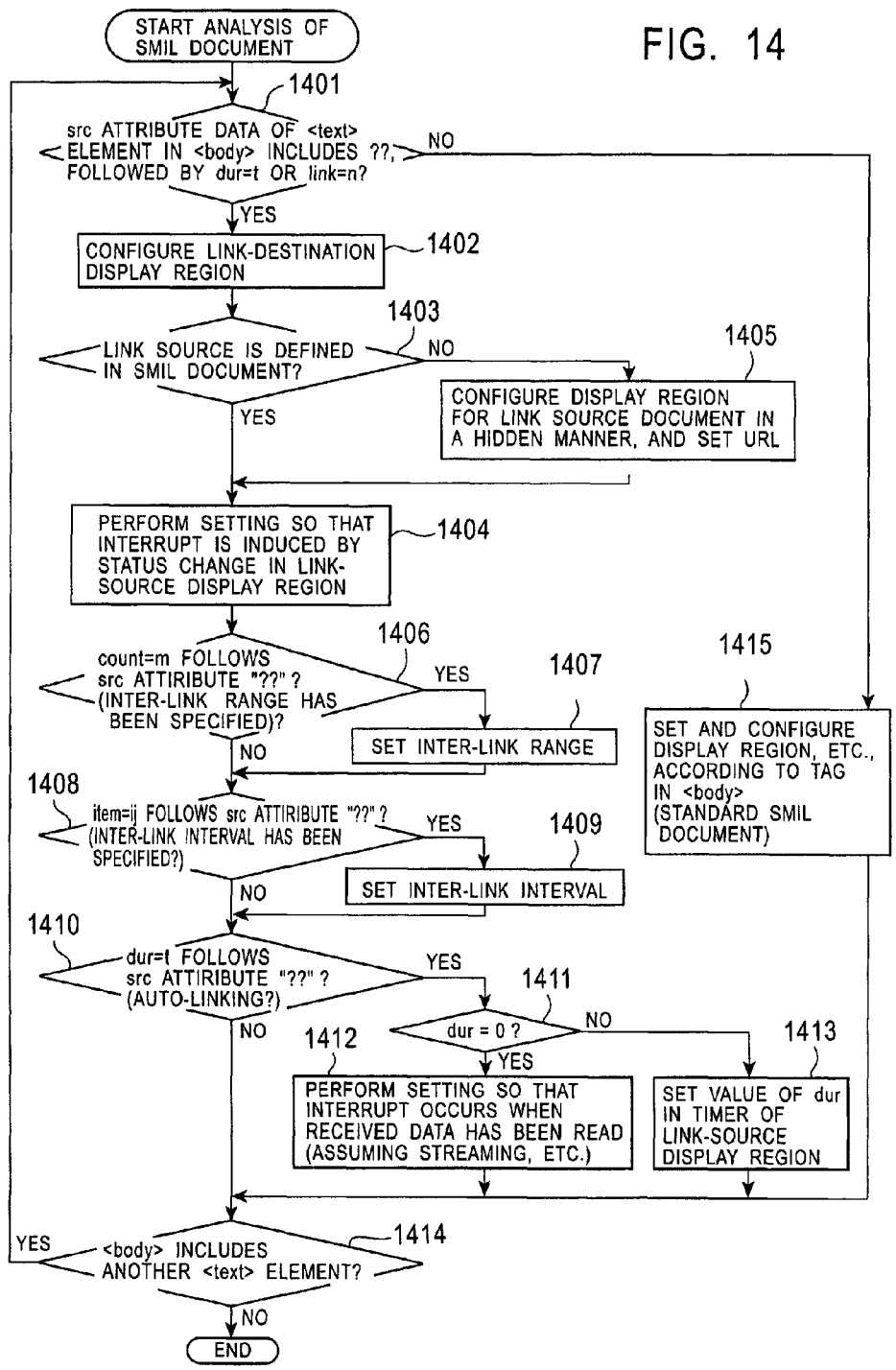
FIG. 14 is a flowchart showing how an extended SMIL document is parsed.

FIG. 14 is a flowchart showing how the extended SMIL document is parsed.

If <body> in the SMIL document includes ?? as the value of an src attribute of the <text> element, followed by dur=t or link=n (YES is obtained in step 1401), a link-destination display region is configured based on the content of the <layout> element, which is a child of the <head> element (step 1402).

Then, it is determined whether or not the link source is defined in the SMIL document (step 1403). If it is defined, setting is performed so that an interrupt is induced by a status change in the link-source display region (step 1404). The status change in the link-source display region is induced by moving the focused item in the link-source display region according to the move-forward/backward code.

If the link source is not defined in the SMIL document, a display region for the link source page is configured in a hidden manner, and the URL of the link source can be freely set on the application side by, for example, the user (step 1405). Then, likewise, the interrupt conditions during auto-linking to the link destination are set so that an interrupt is induced by a status change in the link-source display region (step 1404).

Then, it is determined whether or not there is count=m after the src attribute ?? in the <text> element for specifying the inter-link range (step 1406). If specified, the inter-link range is set as a control parameter for auto-linking to the link destination (step 1407).

It is further determined whether or not there is item=i,j after the src attribute ?? for specifying the link interval (step 1408). If specified, the link jump interval is set as a control parameter for auto-link to the link destination (step 1409).

It is further determined whether or not there is dur=t after the src attribute ?? for specifying the duration condition for auto-linking to the link destination (YES is obtained in step 1410). If dur=0 (YES is obtained in step 1411), assuming that the media object is a stream, setting for auto-linking to the link destination is performed so that an interrupt is induced by complete playback of the stream to automatically link to the next link (step 1412). If the value of dur is set to one or more, this value is set as the value of the auto-link-to-link-destination timer (step 1413).

After this analysis, a similar process is repeated on the next <text> element in the <body> element (step 1414).

If the <text> element, which is a child of the <body> element, does not include the src attribute ?? (NO is obtained in step 1401), this document is processed as a standard SMIL document, that is, a page without auto-linking to the link destination (step 1415).

Next, interrupts are described hereinbelow.

The interrupts include a timer interrupt, an interrupt induced by a status change in the link-source display region, and an interrupt induced by completely reading received data.

Figure 15:
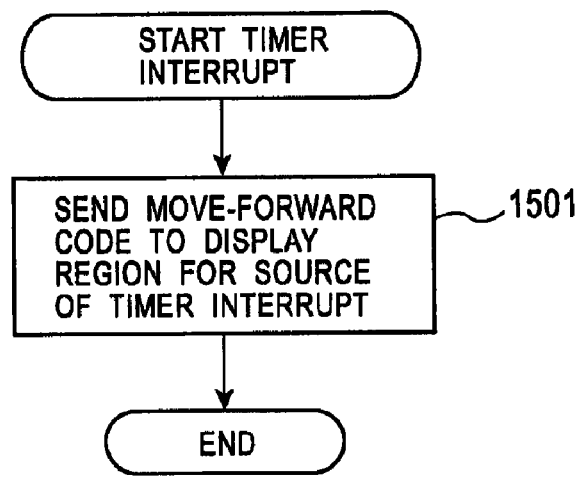
FIG. 15 is a flowchart of a timer interrupt.

As shown in FIG. 15, the timer interrupt occurs when the auto-link-to-link-destination timer finishes. A move-forward/backward code is given to the link-source display region (step 1501). This causes the focus (input permission) to automatically move to the next item.

Figure 16:
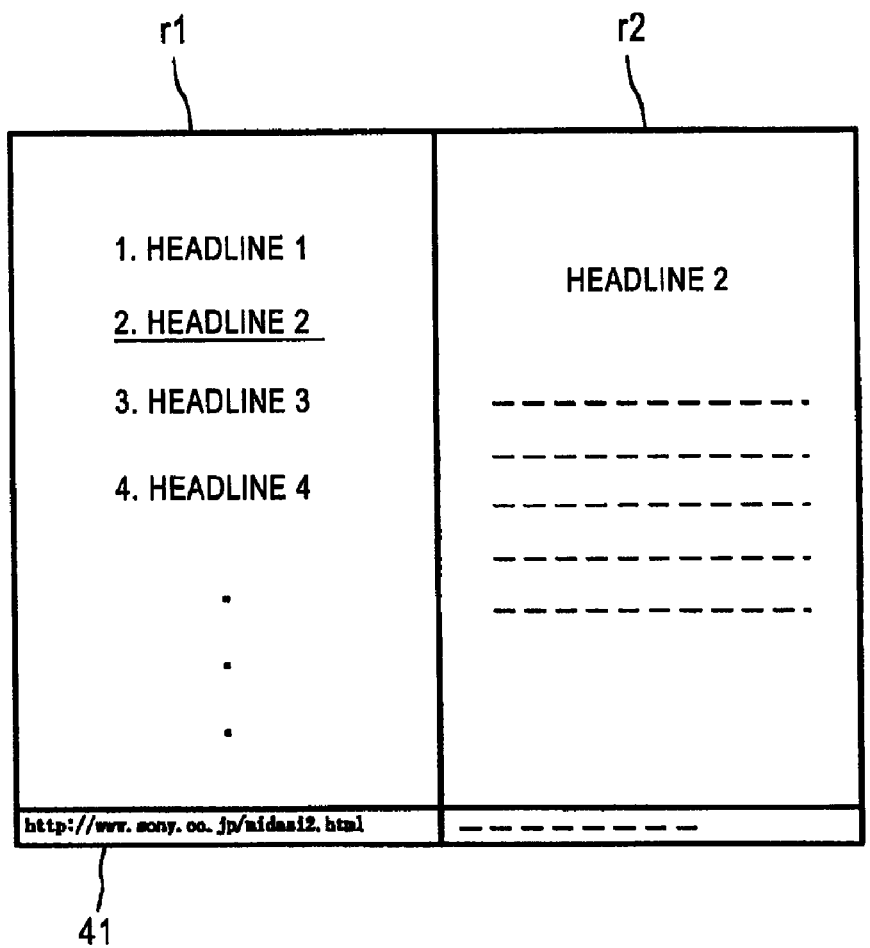
FIG. 16 is a view showing a URL example shown in a status bar.

As shown in FIG. 16, the file name or URL of the currently focused item is displayed in a status bar 41 of a link-source display region r1. When a move-forward code is given to the link-source display region r1, the focus moves to the next item, and the file name or URL displayed in the status bar 41 also changes at the same time. An interrupt is induced by an event where the display of the file name or URL in the status bar 41 is changed.

Figure 17:
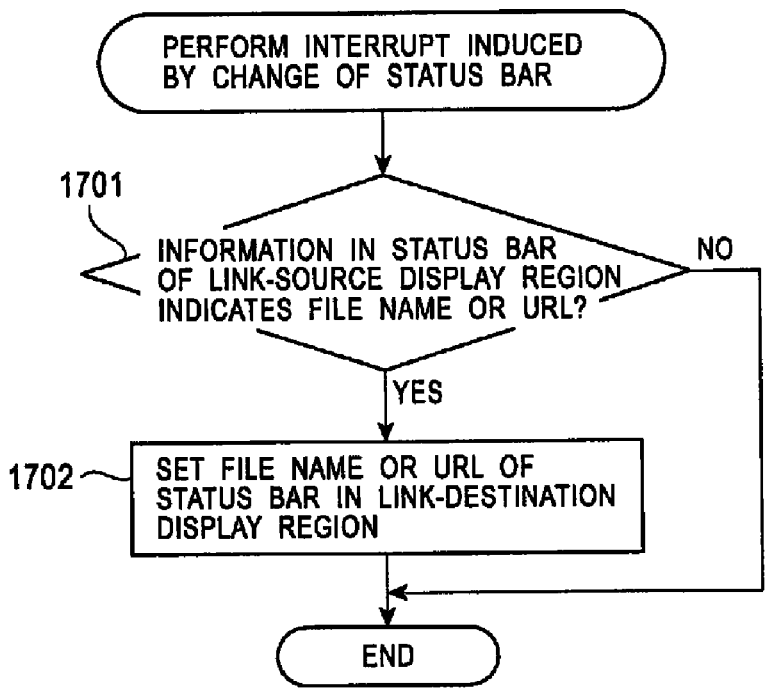
FIG. 17 is a flowchart of an interrupt induced by an event where a file name or URL shown in the status bar changes.

As shown in FIG. 17, in this interrupt, first, it is determined whether or not the information shown in the status bar 41 indicates a file name or a URL (step 1701). If it indicates a file name or a URL, this file name or URL is set in a link-destination display region r2 (step 1702). Therefore, the link destination information is displayed in the link-destination display region r2.

Figure 18:
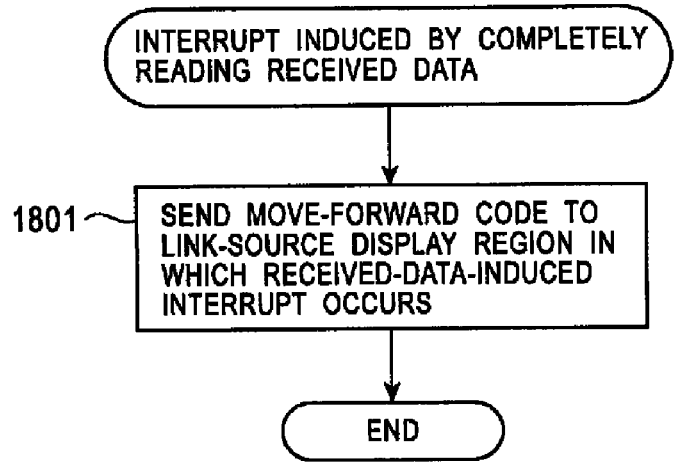
FIG. 18 is a flowchart of an interrupt induced by completely reading received data.

As shown in FIG. 18, the interrupt triggered by completely reading received data occurs in a link-source display region when received data, such as a stream, is completely read. A move-forward code is given to the link-source display region (step 1801). As a result, the focus moves to the next item in the link-source display region, and the display of file name or URL in the status bar of the link-source display region changes. This induces an interrupt triggered by a status change in a link-source display region.

As described above, when a user wants to view the content of link destinations of a designated page in order, typically, users must specify the link destinations one-by-one. In this embodiment, however, a single operation allows users to view the content of the link destinations in order. Pictures, such as photographs, can be automatically changed for display for use in an album slideshow.

Moreover, information of linked pages can cyclically be obtained and displayed, and the latest information of frequently updated pages, such as news, can therefore be displayed.

While the embodiment of the present invention has been described in the context of a television set, the present invention is not limited thereto. The present invention is applicable to any of various electronic apparatuses capable of reading, interpreting, and executing a document containing the above-described description for auto-linking to a page, such as PCs (Personal Computers), PDAs (Personal Digital (Data) Assistants), and cellular phones.

INDUSTRIAL APPLICABILITY

According to the present invention, therefore, linked pages can be displayed in turn by an easy operation for users, thus allowing the users to dynamically view the pages.

The invention claimed is:
1. An electronic apparatus comprising:
a display unit having a display screen;
means for reading a program, the program comprising:
allocation information for defining a display region to be allocated in the display screen,
page specification information identifying a desired page, wherein the desired page includes one or more links to linked pages, and
linking information for at least linking to the linked pages without referencing addresses of the one or more links, wherein the linking information includes an address of a source page and a separate indicator, the indicator indicating that the source page corresponds to the desired page that includes the one or more links;
means for configuring the display region in the display screen based on the allocation information;
means for obtaining the desired page based on the linking information;
means for parsing the desired page to obtain the one or more links;
means for sequentially and automatically accessing the linked pages of over the Internet from the obtained one or more links when required for display, and displaying the accessed linked pages in the display region,
wherein the means for configuring the display region is operable to:
produce a first sub-region and a second sub-region within the display region;
display a list of links to the linked pages in the first sub-region, a first link in the list of links being visually distinguished from the other links in the list of links; and
subsequently after a first linked page corresponding to the first link is retrieved over the Internet, displaying the first linked page in the second sub-region;
wherein the linking information further includes information defining a link time interval, and
the means for obtaining allows the linked pages displayed in the display region to be changed based on the link time interval, wherein the link time interval is determined based on a link duration and a number of links.
2. An electronic apparatus according to claim 1, wherein the linking information further includes information for defining a link range, and
the means for accessing the linked pages allows the linked pages displayed in the display region to be changed within the link range.
3. An electronic apparatus according to claim 2, wherein the link range includes a hierarchical link depth.
4. An electronic apparatus according to claim 1, wherein the linking information further includes information for defining the number of linked pages to be concurrently displayed, and
the means for accessing the linked pages allows the defined number of linked pages to be concurrently displayed in different display regions which are configured in the display screen.
5. An electronic apparatus according to claim 1, wherein the means for sequentially displaying the linked pages in the second sub-region is controlled by a user instruction.
6. An electronic apparatus according to claim 5, wherein the instruction comprises one of:
an instruction to start the displaying;
an instruction to interrupt the displaying;
an instruction to restart the displaying;
an instruction to step forward through the displaying; and
an instruction to step back through the displaying.
7. A page display method for a display unit having a display screen, a control unit, and a storage unit, the method comprising the steps of:
reading a program and storing the program in the storage unit, the program comprising:
allocation information for defining a display region to be allocated in the display screen,
page specification information identifying a desired page, wherein the desired page includes one or more links to linked pages, and
linking information for at least linking to the linked pages without referencing addresses of the one or more links, wherein the linking information includes an address of a source page and a separate indicator, the indicator indicating that the source page corresponds to the desired page that includes the one or more links;
configuring the display region in the display screen based on the allocation information;

obtaining the desired page based on the linking information;

parsing the desired page to obtain the one or more links;

sequentially and automatically accessing the linked pages over the Internet from the obtained one or more links when required for display;

displaying the accessed linked pages in the display region, further comprising:

producing a first sub-region and a second sub-region within the display region;

displaying a list of links to the linked pages in the first sub-region, a first link in the list of links being visually distinguished from the other links in the list of links; and subsequently after a first linked page corresponding to the first link is retrieved over the Internet, displaying the first linked page in the second sub-region;

wherein the linking information further includes information defining a link time interval, and allowing, by the control unit, the linked pages displayed in the display region to be changed based on the link time interval, wherein the link time interval is determined based on a link duration and a number of links.

8. A page display method according to claim 7, wherein the linking information further includes information for defining a link range, and further comprising changing the linked pages displayed in the display region within the link range.

9. A page display method according to claim 8, wherein the link range includes a hierarchical link depth.

10. A page display method according to claim 7, wherein the linking information further includes information for defining the number of linked pages to be concurrently displayed, and further comprising concurrently displaying the defined number of linked pages in different display regions which are configured in the display screen.

11. A page display method according to claim 7, wherein the sequential displaying of the linked pages is controlled by a user instruction.

12. A page display method according to claim 11, wherein the instruction comprises one of:

an instruction to start the displaying;

an instruction to interrupt the displaying;

an instruction to restart the displaying;

an instruction to step forward through the displaying; and an instruction to step back through the displaying.

13. A page display method according to claim 7 wherein the program is described in an extensible markup language.

14. A computer readable storage media comprising instructions that cause a processor to perform a method, the method comprising:

reading a program, the program comprising:

allocation information for defining a display region to be allocated in the display screen, page specification information for identifying a desired page, wherein the desired page includes one or more links to linked pages, and linking information for at least linking to the linked pages without referencing addresses of the one or more links, wherein the linking information includes an address of a source page and a separate indicator, the indicator indicating that the source page corresponds to the desired page that includes the one or more links;

configuring the display region in the display screen based on the allocation information;

obtaining the desired page based on the linking information;

parsing the desired page to obtain the one or more links;

sequentially and automatically accessing the linked pages over the Internet from the obtained one or more links when required for display;

displaying the accessed linked pages in the display region, further comprising:

producing a first sub-region and a second sub-region within the display region;

displaying a list of links to the linked pages in the first sub-region, a first link in the list of links being visually distinguished from the other links in the list of links; and subsequently after a first linked page corresponding to the first link is retrieved over the Internet, displaying the first linked page in the second sub-region;

wherein the linking information further includes information defining a link time interval, and allowing the linked pages displayed in the display region to be changed based on the link time interval, wherein the link time interval is determined based on a link duration and a number of links.

* * * * *